United States Patent
Cowburn et al.

(10) Patent No.: US 11,663,736 B2
(45) Date of Patent: May 30, 2023

(54) MARKER-BASED SHARED AUGMENTED REALITY SESSION CREATION

(71) Applicant: Snap Inc., Santa Monica, CA (US)

(72) Inventors: Piers Cowburn, London (GB); David Li, London (GB); Isac Andreas Müller Sandvik, London (GB); Qi Pan, London (GB); Matan Zohar, Tel Aviv (IL)

(73) Assignee: Snap Inc., Santa Monica, CA (US)

(*) Notice: Subject to any disclaimer, the term of this patent is extended or adjusted under 35 U.S.C. 154(b) by 438 days.

(21) Appl. No.: 16/729,078

(22) Filed: Dec. 27, 2019

(65) Prior Publication Data

US 2021/0201530 A1    Jul. 1, 2021

(51) Int. Cl.
G06T 7/73 (2017.01)
G06F 3/01 (2006.01)
G06T 19/00 (2011.01)

(52) U.S. Cl.
CPC .............. G06T 7/74 (2017.01); G06F 3/011 (2013.01); G06T 19/006 (2013.01); *G06T 2207/30204* (2013.01); *G06T 2219/004* (2013.01); *G06T 2219/024* (2013.01)

(58) Field of Classification Search
CPC ............. G06T 7/74; G06T 2207/30204; G06T 2219/024; G06T 19/006; G06T 2219/004; G06F 3/011
See application file for complete search history.

(56) References Cited

U.S. PATENT DOCUMENTS

| 2010/0287485 A1* | 11/2010 | Bertolami | G06F 3/011 715/764 |
| 2013/0265330 A1* | 10/2013 | Goto | G02B 27/0172 345/632 |
| 2015/0070389 A1* | 3/2015 | Goto | G06T 7/00 345/633 |

(Continued)

FOREIGN PATENT DOCUMENTS

| CN | 114868101 A | 8/2022 |
| WO | 2017027338 | 2/2017 |
| WO | WO-2021133942 A1 | 7/2021 |

OTHER PUBLICATIONS

"International Application Serial No. PCT/US2020/066892, International Search Report dated Apr. 16, 2021", 5 pgs.

(Continued)

*Primary Examiner* — Ryan R Yang
(74) *Attorney, Agent, or Firm* — Schwegman Lundberg & Woessner, P.A.

(57) ABSTRACT

Method for creating marker-based shared augmented reality (AR) session starts with initializing a shared AR session by a first device and by a second device. The first device displays on a display a marker. The second device detects the marker using a camera included in the second device and captures an image of the marker using the camera. The second device determines a transformation between the first device and the second device using the image of the marker. A common coordinate frame is then determined using the transformation, the shared AR session is generated using the common coordinate frame, and the shared AR session is caused to be displayed by the first device and by the second device. Other embodiments are described herein.

20 Claims, 8 Drawing Sheets

(56) References Cited

U.S. PATENT DOCUMENTS

| | | | |
|---|---|---|---|
| 2017/0243403 A1 | 8/2017 | Daniels et al. | |
| 2018/0130259 A1* | 5/2018 | Leefsma | G06T 19/006 |
| 2019/0197788 A1* | 6/2019 | Forbes | G06F 1/163 |
| 2019/0356705 A1 | 11/2019 | Escudero et al. | |
| 2020/0074739 A1* | 3/2020 | Stauber | G06T 7/70 |
| 2020/0143600 A1* | 5/2020 | Dai | G06T 19/00 |
| 2020/0274906 A1* | 8/2020 | Baylis | H04L 67/146 |
| 2020/0342624 A1* | 10/2020 | Nishikawa | A63F 13/22 |
| 2020/0391115 A1* | 12/2020 | Leeper | G06V 20/20 |
| 2021/0256765 A1* | 8/2021 | Huo | H04L 67/12 |

OTHER PUBLICATIONS

"International Application Serial No. PCT/US2020/066892, Written Opinon dated Apr. 16, 2021", 6 pgs.

"International Application Serial No. PCT/US2020/066892, International Preliminary Report on Patentability dated Jul. 7, 2022", 8 pgs.

\* cited by examiner

MARKER-BASED SHARED AUGMENTED REALITY SESSION CREATION

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. The AR system aims to generate and present virtual objects that interact realistically with a real-world environment and with each other. Examples of AR applications can include single or multiple player video games, instant messaging systems, etc.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of an Augmented Reality (AR) creation software and system by establishing a common coordinate system for a shared AR session that is based on a marker. In one embodiment, the system hosts a shared AR session that is a session in which a plurality of users via client devices can participate. The shared AR session can be, for example, an AR car racing game in which each user is controlling a different car. Each of the users are looking at the same shared AR scene being displayed on the client devices at the same time. The experience can be synchronized and shared between all the users. In this example, the actions of one user in the shared AR session can be synchronized and broadcast to all the other users. Accordingly, the shared AR session is a shared virtual space but in AR.

One challenge of generating the shared AR session is to establish the origin of the shared AR scene and how shared AR scene is aligned relative to the surroundings. For example, while the users are tracking the shared AR scene, each of the client devices knows where it is moving around within the shared AR scene. However, the client devices may not agree on the location of the origin of the shared AR scene or how the shared AR scene is aligned relative to the surroundings. Therefore, while each of the client devices are rendering the same virtual content (e.g., cars, racetrack, etc.), the virtual content may not appear at the same place within the shared AR scene on each device. For example, the virtual content may not be rotated to align in the same way on each of the client devices' display screens.

In one embodiment, the system implements a method for all the client devices in a shared AR session to agree on the center of origin of the shared AR scene (or world) and that the shared AR scene is rotated in a particular orientation. In one embodiment, the system creates a shared AR session using a marker to establish the center of origin of the shared AR scene.

Figure 1:
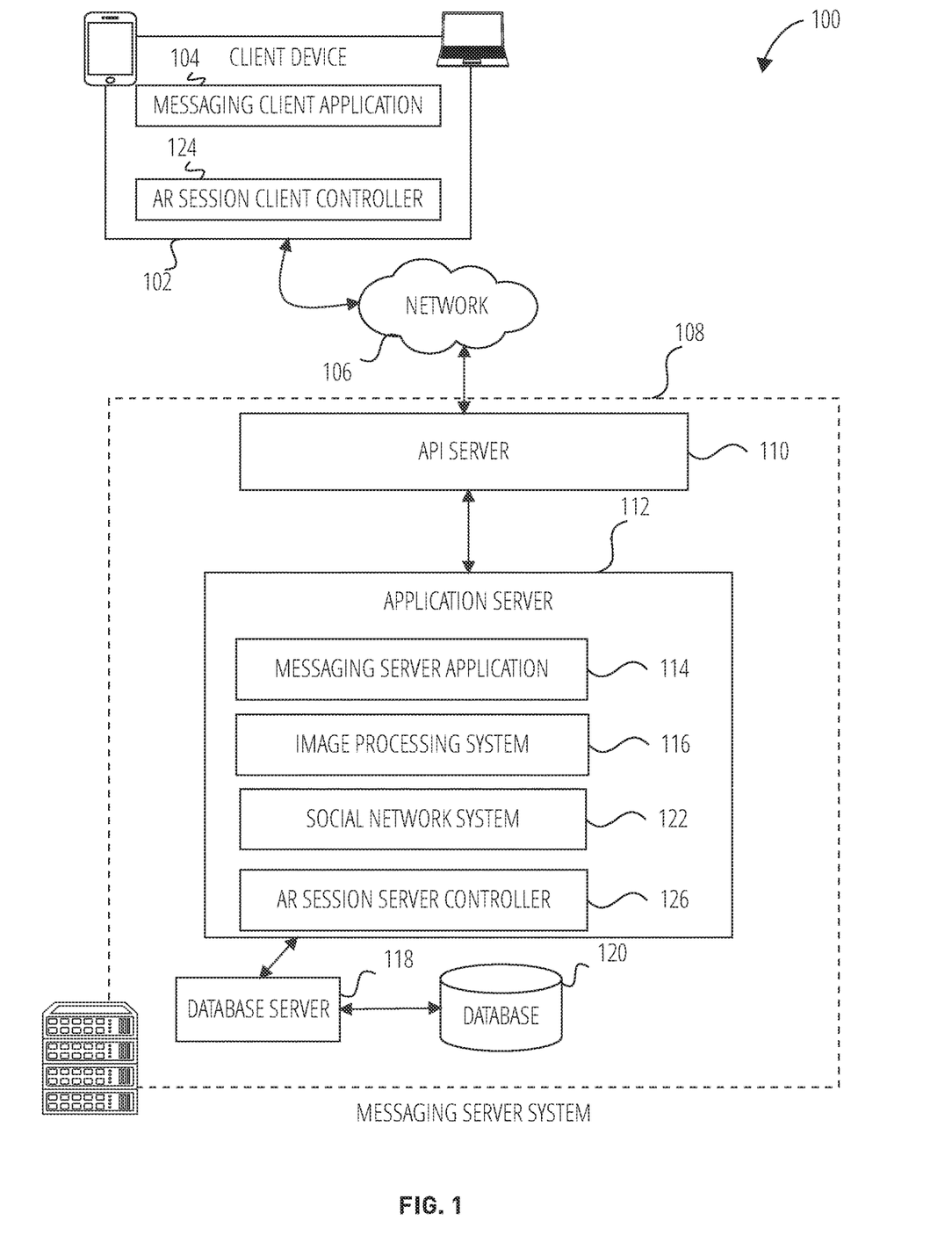
FIG. 1 is a diagrammatic representation of a networked environment in which the present disclosure may be deployed, in accordance with some example embodiments.

FIG. 1 is a block diagram showing an example system 100 for exchanging data (e.g., messages and associated content) over a network. The system 100 includes multiple instances of a client device 102, each of which hosts a number of applications including a messaging client application 104 and an AR session client controller 124. Each messaging client application 104 is communicatively coupled to other instances of the messaging client application 104 and a messaging server system 108 via a network 106 (e.g., the Internet). Each AR session client controller 124 is communicatively coupled to other instances of the AR session client controller 124 and an AR session server controller 126 in the messaging server system 108 via the network 106.

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

The AR session client controller 124 is able to communicate and exchange data with another AR session client controller 124 and with the AR session server controller 126 via the network 106. The data exchanged between the AR session client controller 124, and between the AR session client controller 124 and the AR session server controller 126 can include a session identifier that identifies the shared AR session, the transformation between a first device and a second device (e.g., plurality of client devices 102 include the first and a second device), a common coordinate frame, functions (e.g., commands to invoke functions) as well as other payload data (e.g., text, audio, video or other multimedia data).

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122, and an AR session server controller 126. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
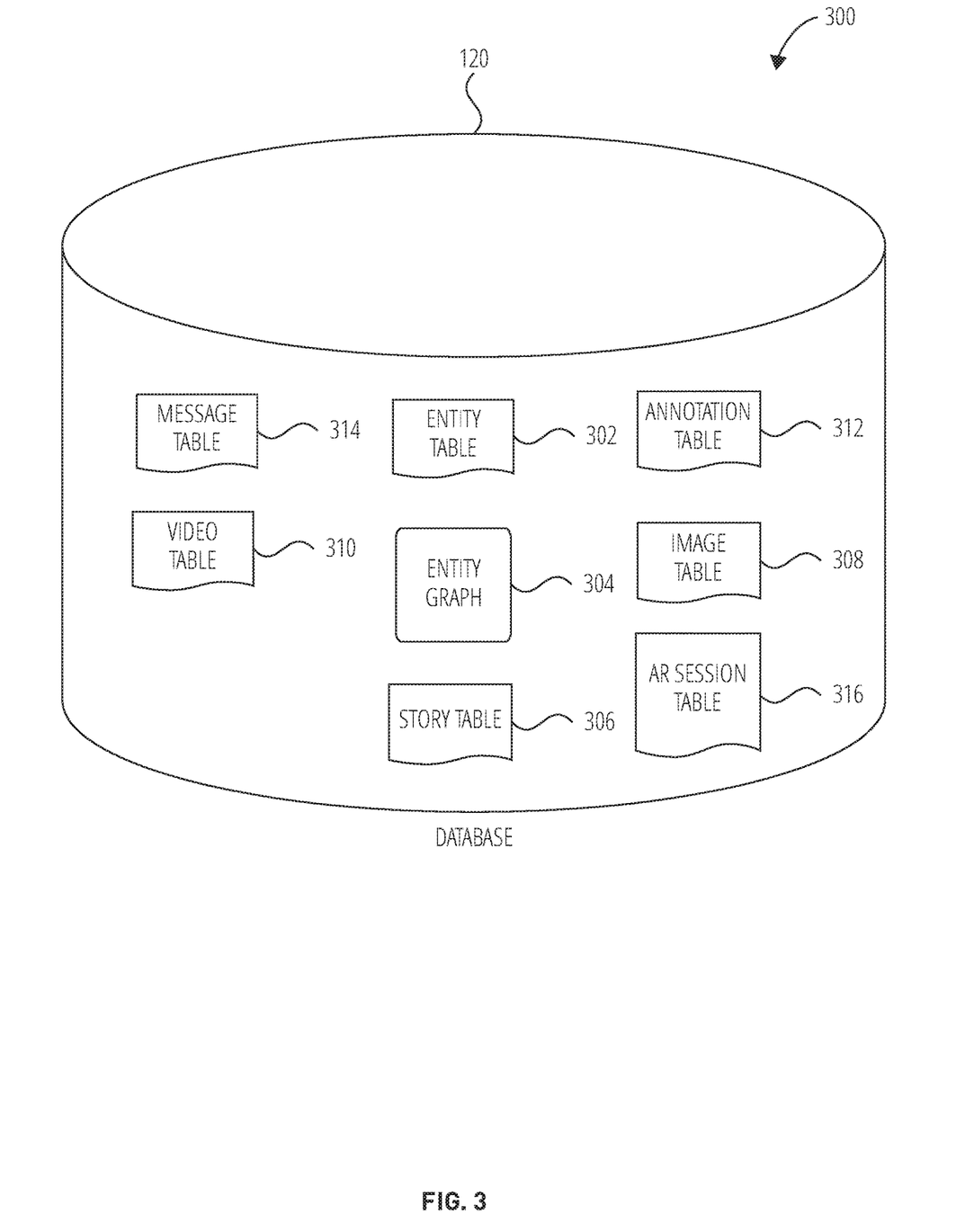
FIG. 3 is a diagrammatic representation of a data structure as maintained in a database, in accordance with some example embodiments.

The social network system 122 supports various social networking functions services and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 also includes the AR session server controller 126 that can communicate with the AR session client controller 124 in the client device 102 to establish individual or shared AR sessions. The AR session server controller 126 can also be coupled to the messaging server application 114 to establish an electronic group communication session (e.g., group chat, instant messaging) for the client devices in a shared AR session. The electronic group communication session can be associated with a session identifier provided by the client devices 102 to gain access to the electronic group communication session and to the shared AR session. In one embodiment, the client devices first gain access to the electronic group communication session and then obtain the session identifier in the electronic group communication session that allows the client devices to access to the shared AR session. In some embodiments, the client devices 102 are able to access the shared AR session without aid or communication with the AR session server controller 126 in the application server 112.

The application server 112 is communicatively coupled to a database server 118, which facilitates access to a database 120 in which is stored data associated with messages processed by the messaging server application 114.

Figure 2:
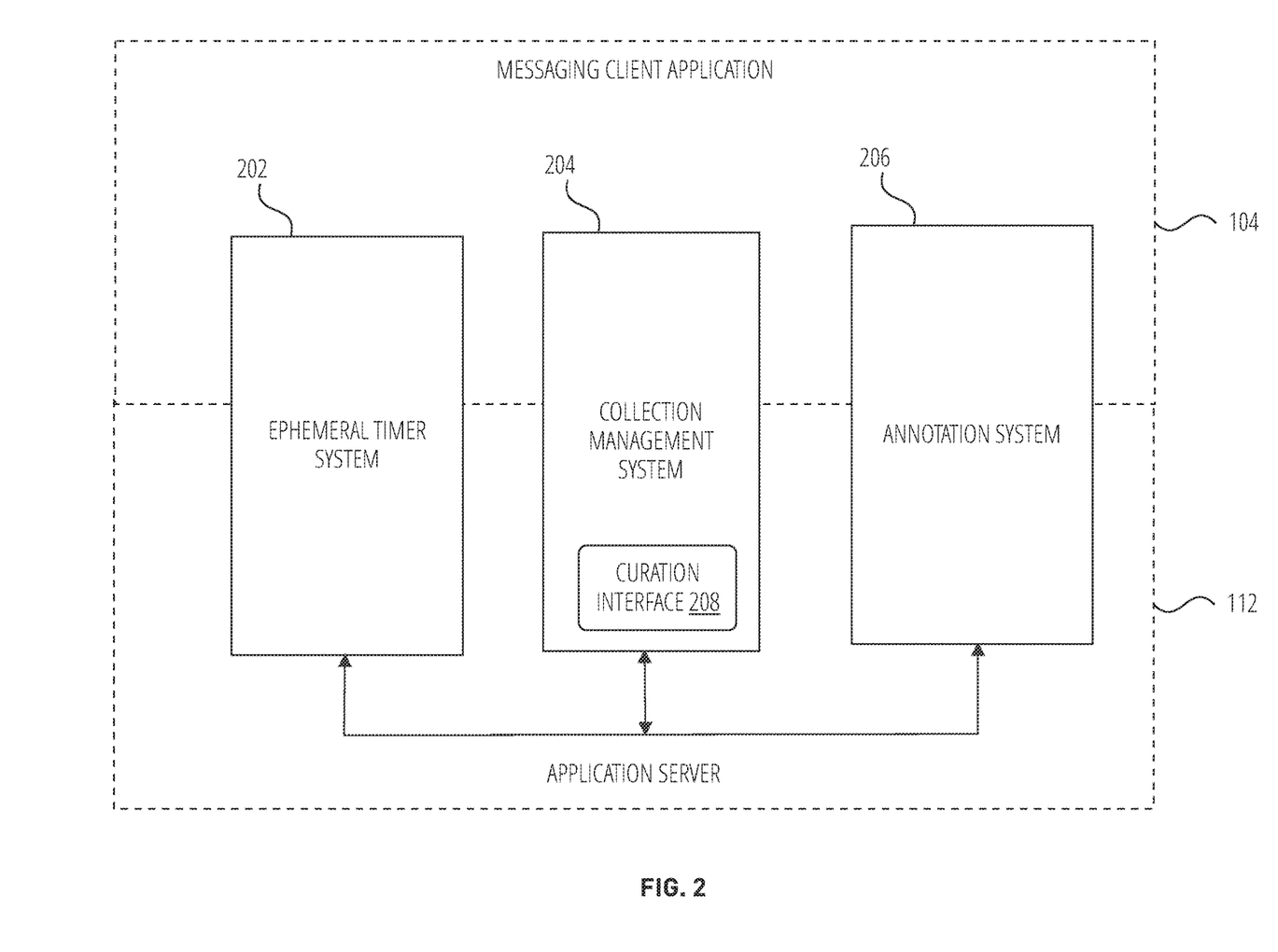
FIG. 2 is a diagrammatic representation of a messaging client application, in accordance with some example embodiments.

FIG. 2 is block diagram illustrating further details regarding the system 100, according to example embodiments. Specifically, the system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages).

Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 can also store data pertaining to individual and shared AR sessions in the AR session table 316. The data in the AR session table 316 can include data communicated between the AR session client controller 124 and another AR session client controller 124, and data communicated between the AR session client controller 124 and the AR session server controller 126. Data can include data used to establish the common coordinate frame of the shared AR scene, the transformation between the devices, the session identifier, etc.

Figure 4:
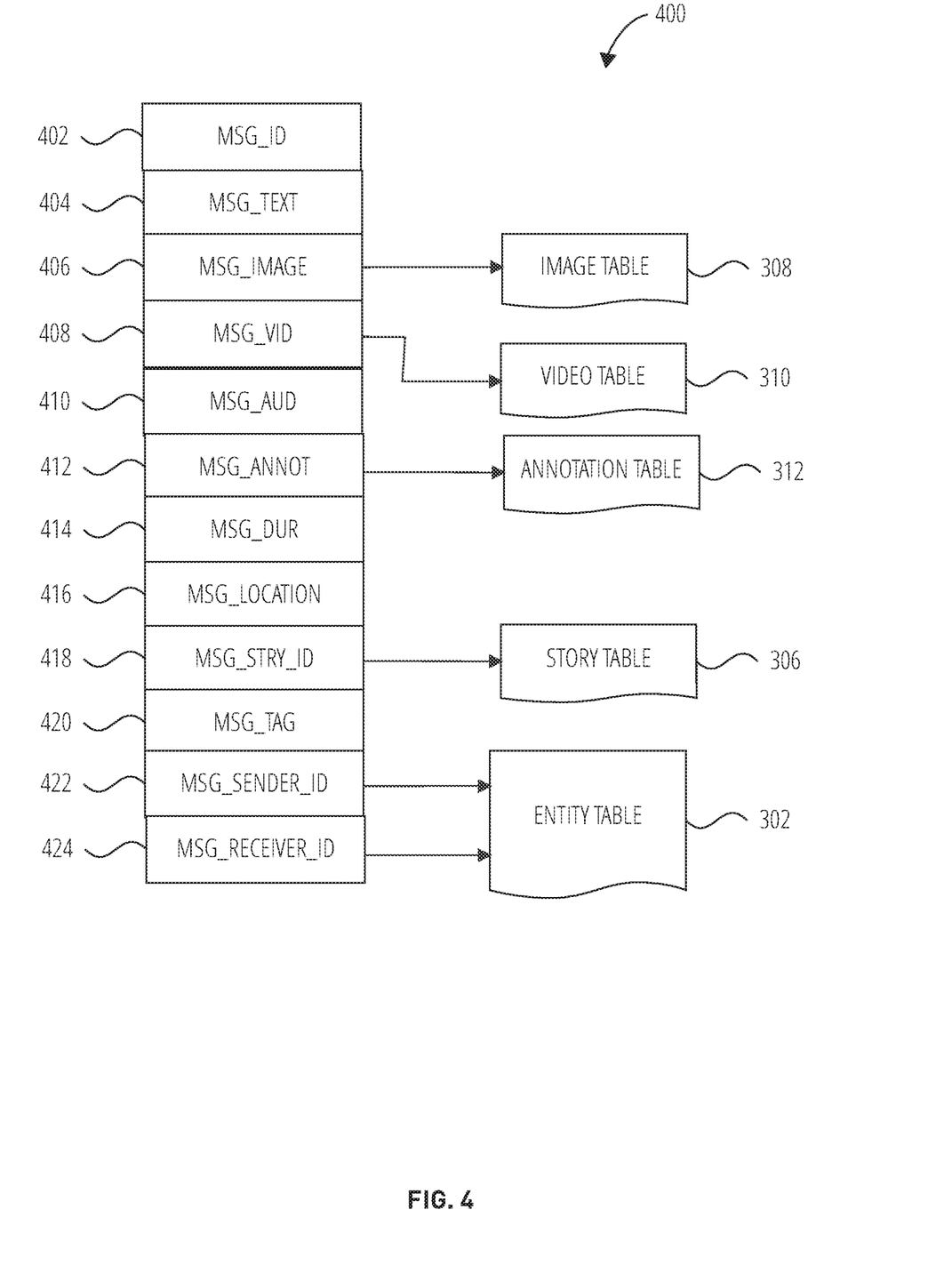
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
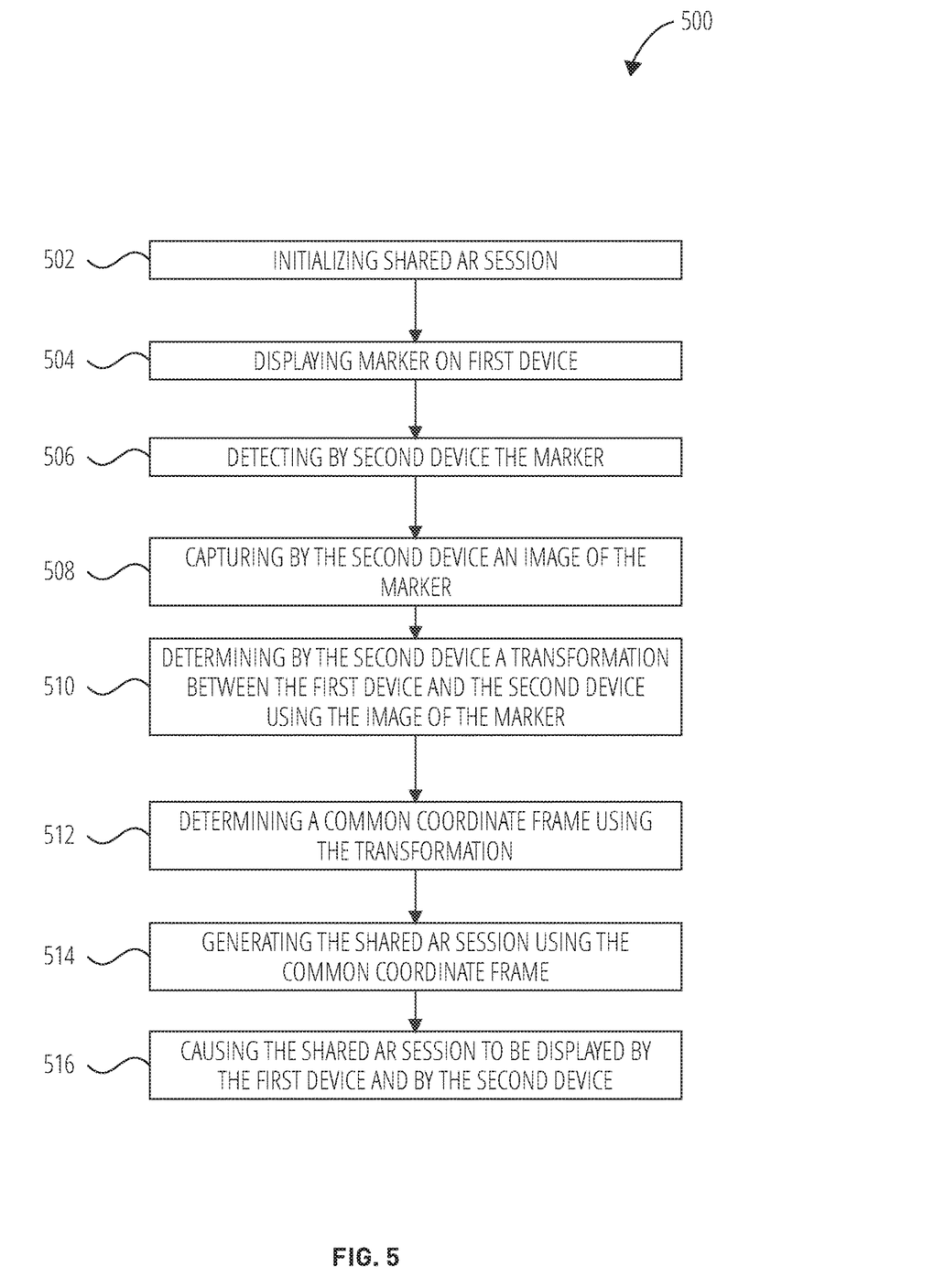
FIG. 5 is a flowchart of a process for creating a marker-based shared AR session, in accordance with some example embodiments.

FIG. 5 is a flowchart of a process for creating a marker-based shared AR session, in accordance with some example embodiments. Although the flowcharts can describe the operations as a sequential process, many of the operations can be performed in parallel or concurrently. In addition, the order of the operations may be re-arranged. A process is terminated when its operations are completed. A process may correspond to a method, a procedure, etc. The steps of methods may be performed in whole or in part, may be performed in conjunction with some or all of the steps in other methods, and may be performed by any number of different systems, such as the systems described in FIG. 1, FIG. 7 and/or FIG. 8, or any portion thereof, such as a processor included in any of the systems.

At operation 502, a first device and second device initialize a shared augmented reality (AR) session. The AR session client controller 124 in each of the first and the second client devices (e.g., client devices 102) can initialize the shared AR session, independently. In one embodiment, during initialization of the shared AR session, the first device and the second device can be in active Simultaneous Localization And Mapping (SLAM) sessions that are independent of each other, and these SLAM session maps need to be aligned with one another to establish the shared AR session.

Initializing the shared AR session can include determining, by the first device, a first device transformation (e.g., known transformation $T_A$). The first device transformation can be based on a first device current pose and a first device origin. The first device current pose can be the position and orientation of the first device with respect to the real-world on an x, y, z-axis. The first device origin is an origin of a coordinate frame tracked by the first device. Similarly, initializing the shared AR session can also include determining, by the second device, a second device transformation (e.g., known transformation $T_B$). The second device transformation can be based on a second device current pose and a second device origin. The second device current pose can be the position and orientation of the second device with respect to the real world on an x, y, z-axis. The second device origin is an origin of a coordinate frame tracked by the second device. The origin of the coordinate frame tracked by the first device can be different from the origin of the coordinate frame tracked by the second device.

At operation 504, the first device displays a marker on the display device of the first device. The AR session client controller 124 in the first device can cause the first device to display the marker. In one embodiment, the marker can be displayed for a number of frames consecutively or can be displayed once periodically (e.g., once every 30 frames). The marker can be a Quick Response (QR) code, a natural feature marker, or a user interface of an application displayed on the display of the first device. In some embodiments, the marker can include the session identifier that is associated with the shared AR session. The marker can, for example, encode the session identifier. The marker can also be a representation of the session identifier. The session identifier can be selected and generated by the AR session client controller 124 of the first device or by the AR session server controller 126. In one embodiment, the appearance of the marker (or specific pixels in the marker) is known by the devices wanting to join into the AR shared session and/or the AR session server controller 126. When the marker is a user interface of an application, the application can be the application related to the shared AR session. For example, the application can be a shared AR video game such that the marker is the user interface of the shared AR video game. One benefit of the marker being the user interface of the application is that the user of the first device does not have to stop using the application to display a different marker, such as a QR code.

In one embodiment, the first device uses the session identifier to access a communication session. The first device can use the session identifier to establish a communication connection or coupling with a real-time messaging service. The real-time messaging service can be the electronic group communication session that is established by the AR session server controller 126.

At operation 506, the second device detects the marker using a camera included in the second device. For example, the second user can point the second device towards the marker that is displayed on the display of the first device such that the marker is in the field of view of the camera included in the second device. The AR session client controller 124 in the second device can detect the marker by analyzing the image within the camera's field of view. In one embodiment, the AR session client controller 124 can implement a marker detection algorithm to detect the marker.

At operation 508, the second device captures an image of the marker using the camera included in the second device. In one embodiment, when the AR session client controller 124 detects the marker, the AR session client controller 124 causes the camera to capture the image of the marker.

In one embodiment, the AR session client controller 124 of the second device extracts the session identifier from the image of the marker and uses the extracted session identifier to access the communication session. For example, the second device can use the session identifier to establish a communication connection or coupling with a real-time messaging service. The real-time messaging service can be the electronic group communication session that is established by the AR session server controller 126.

At operation 510, the AR session client controller 124 of the second device determines a transformation ($T_C$) between the first device and the second device using the image of the marker. The transformation ($T_C$) can be a transformation matrix that describes the transformation between the first device and the second device.

In one embodiment, the second device receives the first device transformation ($T_A$) from the first device and further uses the first device transformation ($T_A$) to determine the transformation ($T_C$) between the first device and the second device. In this embodiment, the transformation ($T_C$) be a transformation matrix that describes the transformation between the first device transformation ($T_A$) and the second device transformation ($T_B$).

The AR session client controller 124 of the second device can also determine a second offset based on the first device transformation ($T_A$). The second offset can be an offset of the second device current pose and the first device origin. In this embodiment, the second offset can be daisy chained with offsets computed by other devices in the shared AR session to ensure that the devices in the shared AR session can agree on the origin of the AR shared session (e.g., shared AR world origin).

In one embodiment, the AR session client controller 124 of the second device determines the transformation ($T_C$) between the first device and the second device by using a position of the marker in the image, a scale of the marker in the image, or a rotation of the marker in the image or any combination thereof. For example, to determine the transformation ($T_C$), the AR session client controller 124 of the second device can use basic computer vision, manipulation of the image, geometry, translation, visual representations, angles, distances, etc.

In one embodiment, the AR session client controller 124 of the second device transmits the transformation ($T_C$) to the AR session client controller 124 of the first device and/or the AR session server controller 126. The AR session client controller 124 of the second device can also transmit the transformation ($T_C$) in the (group) communication session.

At operation 512, the AR session client controller 124 of the second device determines a common coordinate frame using the transformation ($T_C$). In one embodiment, the AR session client controller 124 of the first device can determine the common coordinate frame using the transformation ($T_C$) received from the second device.

In one embodiment, the AR session client controller 124 of the second device transmits the common coordinate frame to the AR session client controller 124 of the first device and/or the AR session server controller 126. The AR session client controller 124 of the second device can also transmit the common coordinate frame in the (group) communication session.

At operation 514, the AR session client controller 124 of the second device generates the shared AR session using the common coordinate frame. In one embodiment, the AR session client controller 124 of the first device can generate the shared AR session using the common coordinate frame received from the second device.

At operation 516, the AR session client controller 124 in the first device causes the shared AR session to be displayed by the first device and the AR session client controller 124 in the second device causes the shared AR session to be displayed by the second device. In one embodiment, the shared AR scenes included in the shared AR session are caused to be displayed by the first device and the second device.

In one embodiment, rather than the first device displaying the marker on the first device's display at operation 504, the marker can be the first device itself. In this embodiment, the 3-dimensional (3-D) appearance of the first device can be the marker such that the AR session client controller 124 of the second device can detect the first device at any angle or positioning within the field of view of the second device's camera as the marker and causes the camera to capture the image of the first device. In this embodiment, rather than using a one-time coordinate setting using the marker, the relative transform (e.g., transformation $T_C$) can be constantly updated by capturing images of the first device periodically and updating the common coordinates, accordingly. In this embodiment, the database 120 can store a database of images of different electronic devices at different angles and positions that can serve as the marker.

In another embodiment, to further refine the determination of the common coordinate frame, the time delay between the instant that the second device determines the transformation ($T_C$) and the instant that the first device sends the first transformation ($T_A$) to the second device needs to be addressed. At the exact instant that the scan or tracking occurs, the second device needs the transformation ($T_C$) and the first transformation ($T_A$). Rather than sending the first transformation ($T_A$) as a single data point, in this embodiment, the first device sends a stream of first transformations ($T_A$) over time. The AR session client controller 124 of the second device needs to establish the global time at which the alignment is to be performed. The global time can be obtained from the application server 112 but there is still some latency introduced. To refine the time that is provided from the application server 112, the second device can capture a video or at multiple frames of the marker. For example, the first device can display visual transformation of the marker (e.g., rotation, scaling, blinking, moving in different directions on the display screen, using several markers and tracking the movements and orientations of the markers relative to each other). The second device can then determine the time (e.g., in milliseconds) that the first device sent the first transformation ($T_A$) and obtain the first transformation ($T_A$) from the stream of first transformations ($T_A$).

In one example, the first device can display a rotating marker which is captured by the second device. The AR session client controller 124 of the second device can use the captured video or multiple frames of the rotating marker to refine the time code received from the AR session server controller 126 or application server 112. Specifically, the known rotation speed of the marker can be used to resolve the ambiguity as to which frame is the precise frame on which the common coordinate frame should be based.

In one embodiment, the AR session client controller 124 of the second device can filter out images of the marker that result in a transformation ($T_C$) that is contrary to gravity. Although the frames captured of the marker are offset in rotation in a position along the ground plane, both the first device and the second device can agree on where the ground is (e.g., which direction is up versus down). The AR session client controller 124 of the second device performs a gravity check by determining whether the first current pose that is observed (or the image of the marker that is captured) is contrary to gravity.

In this embodiment, the AR session client controller 124 of the second device receives information including the angle of the gravity axis and uses this information to compare with the tracking data of the marker (e.g., frames captured of the marker by the camera in second device). The AR session client controller 124 of the second device can then check whether the first device and the second device agree on how the poses of the first device are oriented with respect to the gravity position. The AR session client controller 124 of the second device can then filter out the data (or frames captured of the marker) where there is disagreement on the orientation with respect to the gravity position (e.g., lower quality data).

In another embodiment, the AR session client controller 124 of the second device can further refine the common coordinate frame using reprojection. When the AR session client controller 124 of the second device detects the marker and captures the image of the marker using the camera, the AR session client controller 124 of the second device re-projects the image of the marker on a display screen space and analyses the pixels of the marker that are detected. Based on the analysis of the pixels that are re-projected, the AR session client controller 124 of the second device can cause the second device to display a notification that indicates whether the marker was captured adequately (e.g., "too far from marker", "too fast", etc.). In another example, the AR session client controller 124 of the second device captures a plurality of images of the marker to average out the potential errors in the capture.

In one embodiment, the AR session client controller 124 of the second device can capture the image or a plurality of images of the marker before being connected to the AR session server controller 126 or the application server 112. The first device can maintain a trailing window of poses that are known by the first device in terms of position (angle of the gravity axis) and orientation of the first device with respect to the origin of the coordinate frame tracked by the first device. The second device can start recording or capturing images of the marker (e.g., a pose history) once the marker is detected within the field of view of the second device's camera. Once connected to the application server 112, the first device can transmit the trailing window of poses to the second device. The second device can use the addition of the visual temporal alignment to match the two streams (e.g., the trailing window from the first device and the pose history from the second device) in time.

In one embodiment, when using the user interface of an application displayed on a first device as a marker, rather than capturing the user interface by the second device, the first device can send each frame of the user interface to the second device. The second device can then perform stream alignment using the stream of frames received.

In another embodiment, the marker can also encode one or more poses of the first device into a code. The second device can decode the code from the image of the marker and obtain the one or more poses of the first device.

Figure 6:
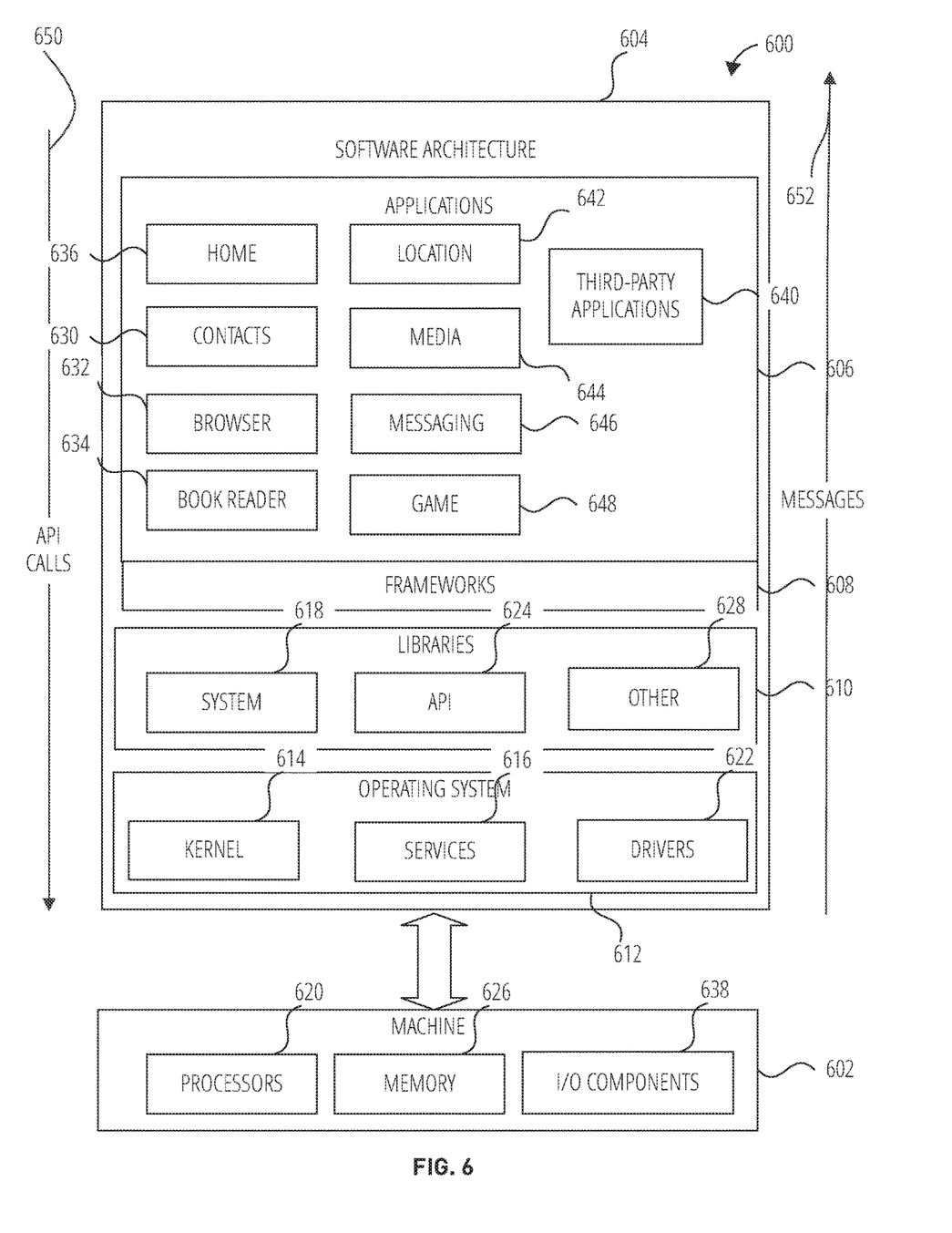
FIG. 6 is block diagram showing a software architecture within which the present disclosure may be implemented, in accordance with some example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640.

The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
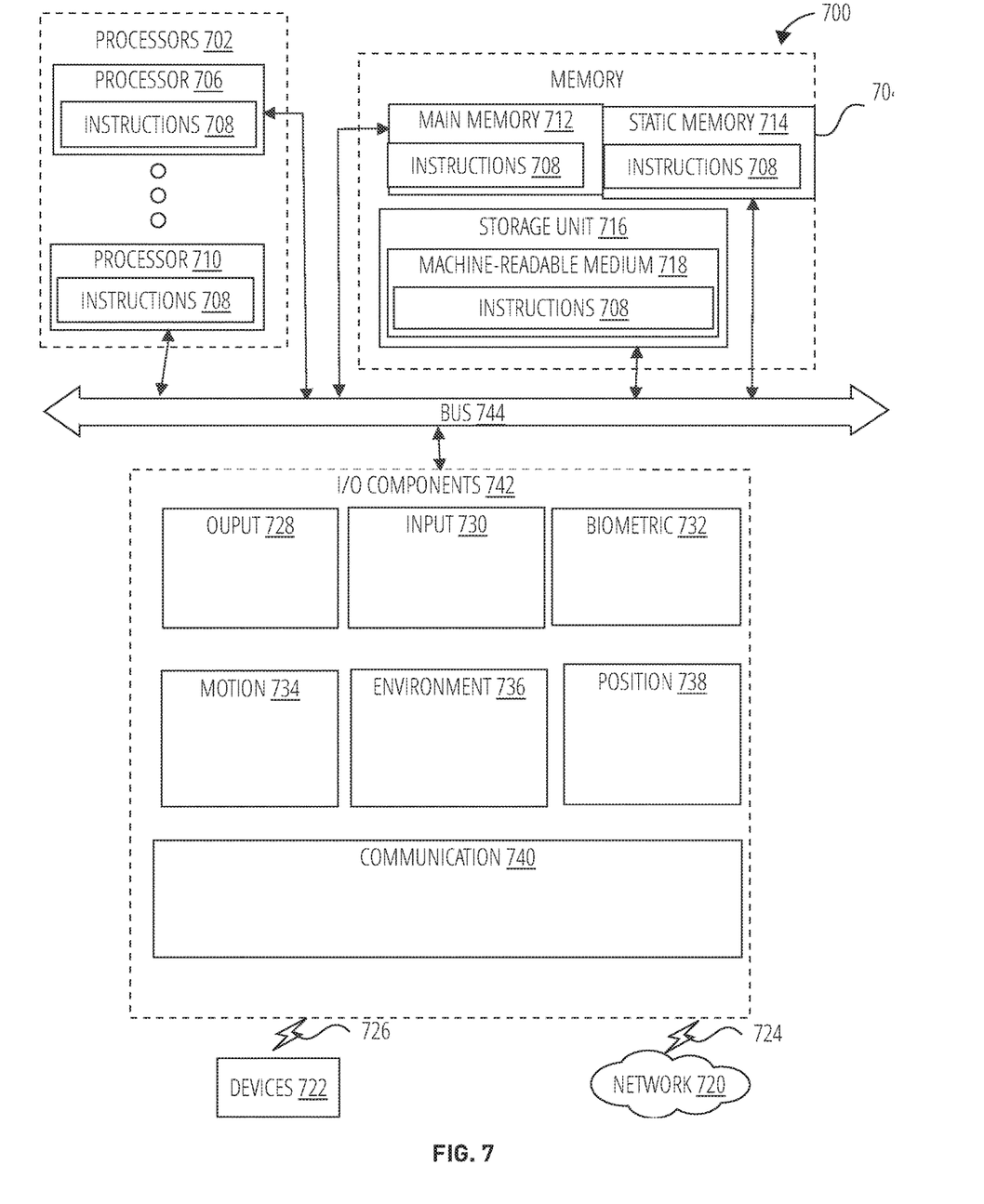
FIG. 7 is a diagrammatic representation of a machine, in the form of a computer system within which a set of instructions may be executed for causing the machine to perform any one or more of the methodologies discussed, in accordance with some example embodiments.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF417. Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Figure 8:
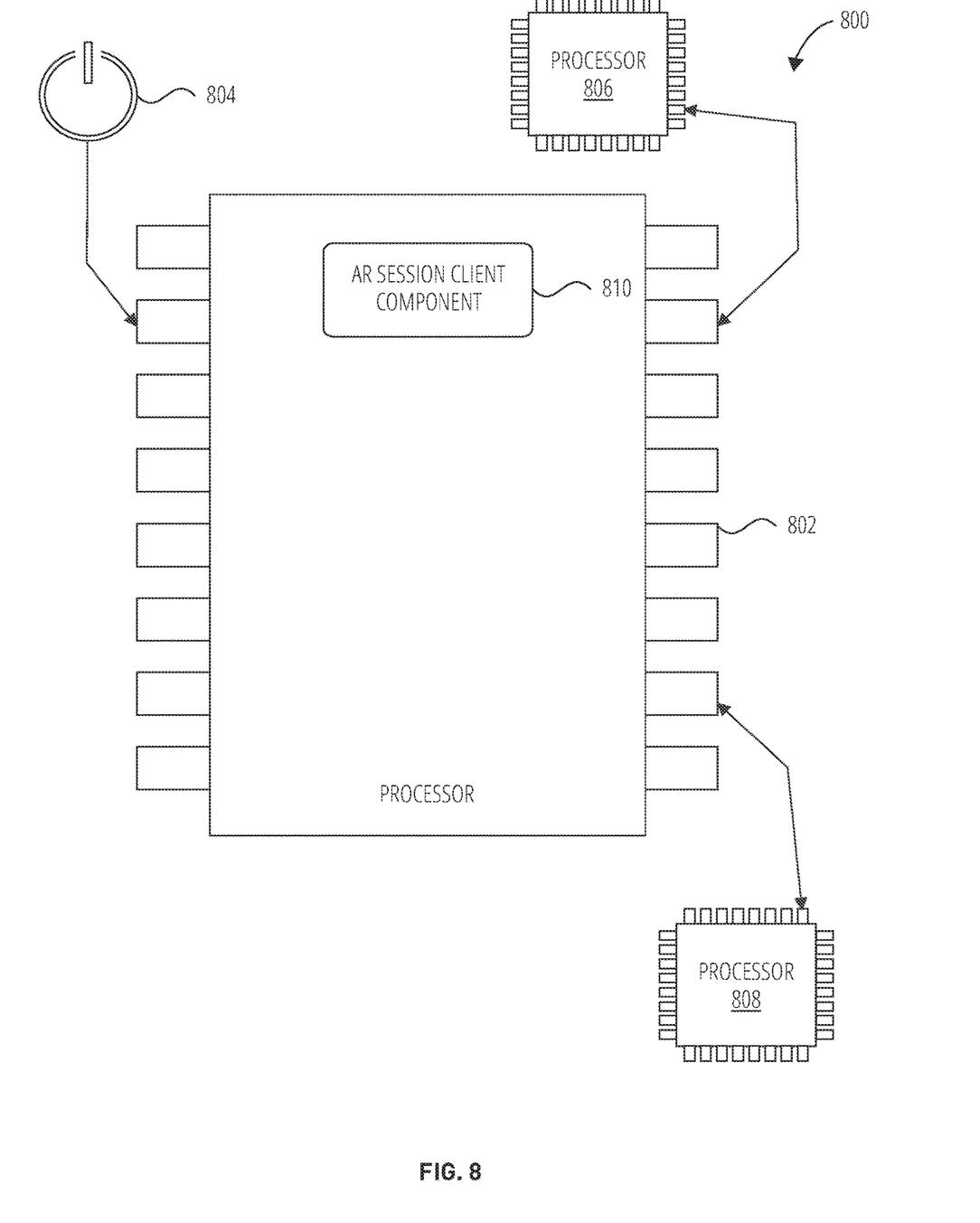
FIG. 8 is a diagrammatic representation of a processing environment, in accordance with some example embodiments.

Turning now to FIG. 8, there is shown a diagrammatic representation of a processing environment 800, which includes the processor 806, the processor 808, and a processor 802 (e.g., a GPU. CPU or combination thereof).

The processor 802 is shown to be coupled to a power source 804, and to include (either permanently configured or temporarily instantiated) modules, namely an AR session client controller component 810. The AR session client component 810 operationally can, for example, initialize a shared AR session, cause a marker to be displayed, capture an image of the marker using a camera, generate a transformation ($T_C$) and a common coordinate frame, and causes the shared AR session to be displayed. While not shown the processor 802 can alternatively include an AR session server controller component that can perform the operations of the AR session server controller 126. As illustrated, the processor 802 is communicatively coupled to both the processor 806 and processor 808.

Where a phrase similar to "at least one of A, B, or C," "at least one of A, B, and C." "one or more A, B. or C." or "one or more of A, B. and C" is used, it is intended that the phrase be interpreted to mean that A alone may be present in an embodiment, B alone may be present in an embodiment, C alone may be present in an embodiment, or that any combination of the elements A, B and C may be present in a single embodiment: for example, A and B, A and C. B and C. or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    initializing a shared augmented reality (AR) session by a first device and by a second device;
    displaying on a display of the first device a marker;
    detecting, by the second device, the marker using a camera, the second device including the camera;
    capturing, by the second device, an image of the marker using the camera;
    re-projecting the image of the marker, by the second device, to a display screen space to determine a quality of the image of the marker being captured, wherein re-projecting the image of the marker comprises causing the second device to display the image of the marker on the display screen space;
    determining, by the second device, a transformation between the first device and the second device using the image of the marker;
    determining a common coordinate frame using the transformation;
    generating the shared AR session using the common coordinate frame; and
    causing the shared AR session to be displayed by the first device and by the second device.

2. The method of claim 1, wherein initializing the shared AR session by the first device and by the second device comprises:
    determining, by the first device, a first device transformation, wherein the first device transformation is based on a first device current pose and a first device origin, wherein the first device origin is an origin of a coordinate frame tracked by the first device;
    determining, by the second device, a second device transformation, wherein the second device transformation is based on a second device current pose and a second device origin, wherein the second device origin is an origin of a coordinate frame tracked by the second device.

3. The method of claim 2, wherein determining, by the second device, the transformation between the first device and the second device using the image of the marker further comprises:
    receiving, by the second device, the first device transformation from the first device.

4. The method of claim 3, wherein determining, by the second device, the transformation between the first device and the second device using the image of the marker further comprises:
    determining, by the second device, a second offset based on the first device transformation, wherein the second offset is an offset of the second device current pose and the first device origin.

5. The method of claim 4, wherein determining, by the second device, the transformation between the first device and the second device using the image of the marker further comprises:
    determining the transformation using a position of the marker in the image, a scale of the marker in the image, or a rotation of the marker in the image.

6. The method of claim 5, further comprising:
    performing, by the second device, a gravity check, wherein performing the gravity check includes:
    determining whether a direction of gravity based on the first device transformation corresponds to a direction of gravity based on the transformation between the first device and the second device.

7. The method of claim 1, wherein the marker includes a session identifier.

8. The method of claim 7, wherein the marker is a Quick Response (QR) code, a natural feature marker, or a user interface of an application displayed on the display of the first device.

9. The method of claim 8, further comprising:
    extracting, by the second device, the session identifier from the image of the marker.

10. The method of claim 9, further comprising:
    accessing by the first device a communication session using the session identifier included in the marker displayed on the display of the first device; and
    accessing, by the second device, the communication session using the session identifier that is extracted from the image of the marker.

11. The method of claim 1, further comprising:
    causing the second device to display a notification indicating the quality of the captured marker image.

12. A system comprising:
a processor; and
a memory component having instructions stored thereon, when executed by the processor, causes the processor to perform operations comprising:
  detecting a marker displayed by a first device using a camera included in a second device;
  capturing an image of the marker using the camera;
  re-projecting the image of the marker, by the second device, to a display screen space to determine a quality of the image of the marker being captured, wherein re-projecting the image of the marker comprises causing the second device to display the image of the marker on the display screen space;
  determining a transformation between the first device and the second device using the image of the marker;
  determining a common coordinate frame using the transformation;
  generating a shared AR session using the common coordinate frame; and
  causing the shared AR session to be displayed by the first device and by the second device.

13. The system of claim 12, wherein the marker includes a session identifier.

14. The system of claim 13, wherein the marker is a Quick Response (QR) code, a natural feature marker, or a user interface of an application displayed on the display of the first device.

15. The system of claim 13, wherein the operations further comprising:
  extracting the session identifier from the image of the marker.

16. The system of claim 15, wherein the operations further comprising:
  providing access to the first device to a communication session based on the session identifier included in the marker displayed on the display of the first device; and
  providing access to the second device to the communication session based on the session identifier that is extracted from the image of the marker.

17. The system of claim 12, wherein the operations further comprising:
  receiving from the first device, a first device transformation, wherein the first device transformation is based on a first device current pose and a first device origin, wherein the first device origin is an origin of a coordinate frame tracked by the first device.

18. The system of claim 17, wherein determining the transformation between the first device and the second device using the image of the marker further comprises:
  determining a second offset based on the first device transformation, wherein the second offset is an offset of a second device current pose and the first device origin.

19. The system of claim 18, wherein determining the transformation between the first device and the second device using the image of the marker further comprises:
  determining the transformation using a position of the marker in the image, a scale of the marker in the image, or a rotation of the marker in the image.

20. A non-transitory computer-readable storage medium having stored thereon, instructions when executed by a processor, causes the processor to perform operations comprising:
  detecting a marker displayed by a first device using a camera included in a second device;
  capturing an image of the marker using the camera;
  re-projecting the image of the marker, by the second device, to a display screen space to determine a quality of the image of the marker being captured, wherein re-projecting the image of the marker comprises causing the second device to display the image of the marker on the display screen space;
  determining a transformation between the first device and the second device using the image of the marker;
  determining a common coordinate frame using the transformation;
  generating a shared AR session using the common coordinate frame; and
  causing the shared AR session to be displayed by the first device and by the second device.

* * * * *